United States Patent [19]

Ferguson et al.

[11] Patent Number: 4,830,180
[45] Date of Patent: May 16, 1989

[54] ARTICLE INSPECTION AND STABILIZING SYSTEM

[75] Inventors: W. Sheldon Ferguson, Weston; Howard E. Paulson; Robert E. Ruthven, both of Milton-Freewater, all of Oreg.

[73] Assignee: Key Technology, Inc., Milton-Freewater, Oreg.

[21] Appl. No.: 144,497

[22] Filed: Jan. 15, 1988

[51] Int. Cl.⁴ .............................................. B65G 47/19
[52] U.S. Cl. ..................................... 198/836; 198/454
[58] Field of Search ............... 198/446, 445, 454, 458, 198/469.1, 502.2, 503, 525, 526, 534, 604, 603, 605, 610–612, 620, 780, 836, 383; 209/539

[56] References Cited

U.S. PATENT DOCUMENTS

| | | | |
|---|---|---|---|
| 1,514,281 | 11/1924 | Grubb | 356/56 |
| 1,749,156 | 3/1930 | Pflimlin | 29/130 |
| 2,154,844 | 4/1939 | Harker et al. | 198/779 |
| 2,558,899 | 7/1951 | Green | 198/383 X |
| 3,387,695 | 6/1968 | Hendrickson | 198/446 X |
| 3,620,347 | 11/1971 | Wyland | 198/836 X |
| 3,761,134 | 9/1973 | Hurd | 406/83 |
| 3,950,924 | 4/1976 | Quick | 198/780 X |
| 4,074,807 | 2/1978 | Goulds | 198/445 X |
| 4,279,338 | 7/1981 | Sekora | 198/525 |
| 4,365,717 | 12/1982 | Stone | 209/539 |
| 4,581,632 | 4/1986 | Davis et al. | 358/106 |

Primary Examiner—Frank E. Werner
Assistant Examiner—Lyle K. Kimms
Attorney, Agent, or Firm—Wells, St. John & Roberts

[57] ABSTRACT

An article inspection system is described wherein articles are fed to a working flight of a conveyor moving at high velocity. The articles are delivered through a stabilizer to an article inspection device. The articles are fed to the working flight of the conveyor in a laterally spaced relationship and at a velocity different than the high forward velocity of the continuously moving working flight. The stabilizer is utilized to adjust the velocity of the individual articles to match that of the working flight, and to stabilize the articles individually in laterally spaced orientations across the working flight. The stabilizer includes a flexible, open mesh surface that is mounted by a resilient core to a rotatable shaft. A drive wheel is mounted to the shaft and engages the working flight to rotate the open mesh surface at a velocity matching that of the working flight. Articles are engaged by the open mesh fabric and are gently brought into a stabilized condition against the working flight as it moves along. The stabilized articles are then moved at the high velocity of the working flight past an inspection device which then inspects each individual article.

7 Claims, 2 Drawing Sheets

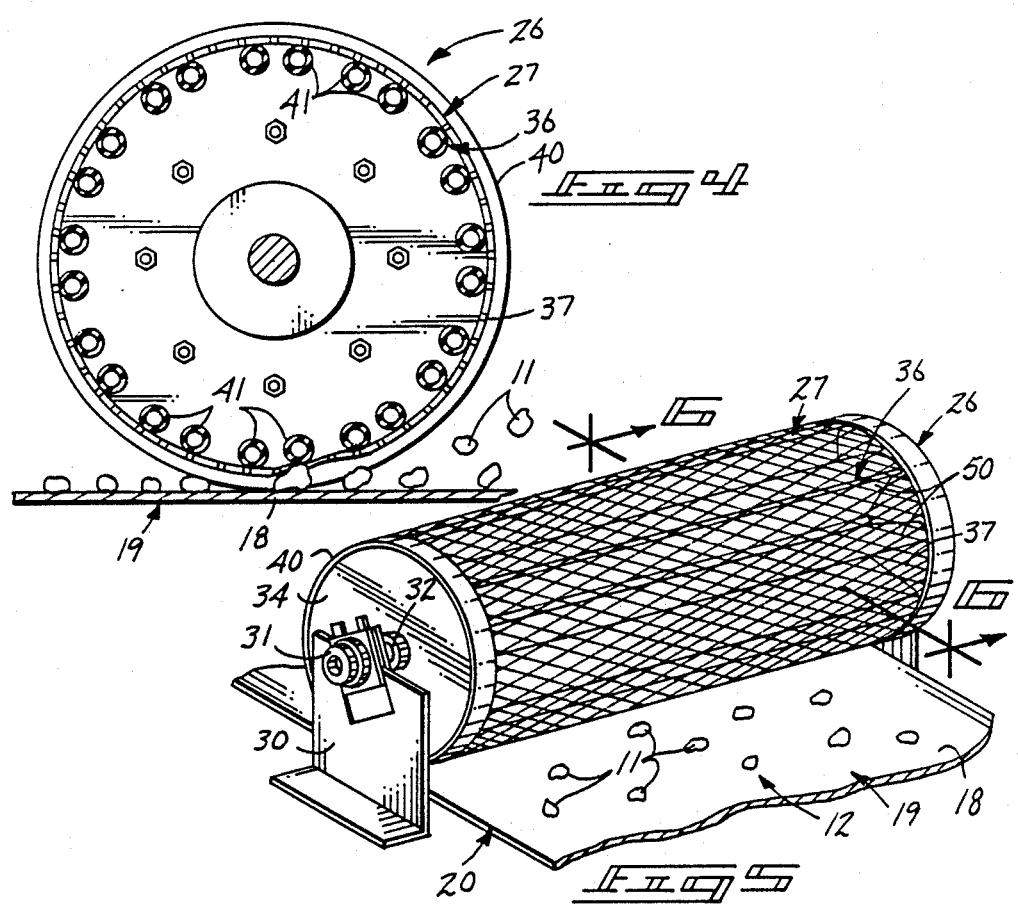
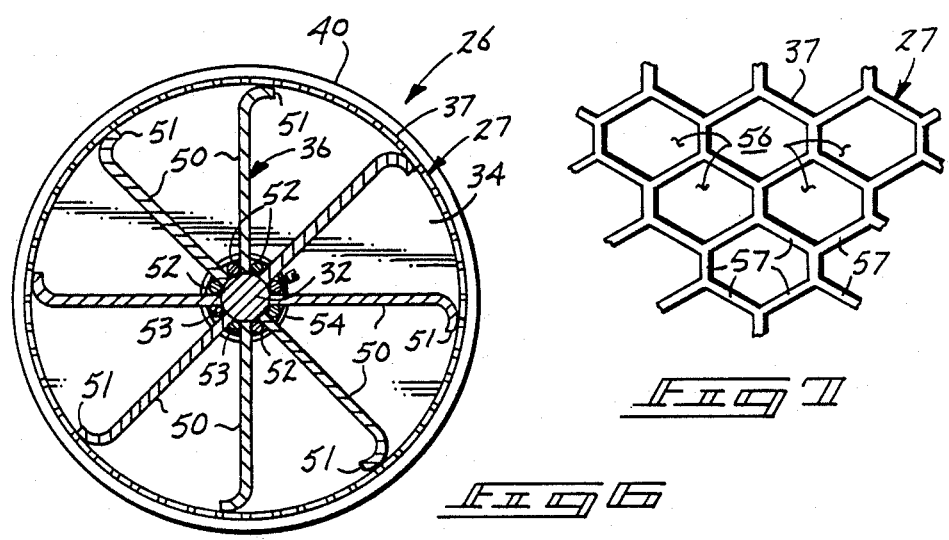

ARTICLE INSPECTION AND STABILIZING SYSTEM

TECHNICAL FIELD

The present invention relates to receiving and stabilizing individual articles on a moving surface and to inspecting the individual articles as they are moved past an inspection device.

BACKGROUND OF THE INVENTION

Inspection of bulk materials is a tedious task. In the food processing industry, for example, great care is taken to eliminate defective food articles from being passed on to the consumer. Detection of flaws or blemishes in small cut vegetable pieces is especially difficult due to the high number of small food articles being processed.

In the past, food articles were hand graded and sorted. This process is unsatisfactory due to human error and inconsistencies in human judgment. Vast improvements have been made to eliminate human error by implementing optical inspection systems. A very effective optical inspection system is disclosed in U.S. Pat. No. 4,581,632 granted in 1986 to the assignee of the present application. The system has capability of optically inspecting at volumes considerably higher than previously possible using manual visual techniques. In fact, the disclosed inspection system could operate at even higher capacity but for the slow feeding and transport mechanisms used to move the product past the inspection mechanisms.

Optical inspection is best effected when the product being inspected is relatively stable while being moved past the inspection station. Prior inspection apparatus have not effectively stabilized food products for inspection at high speed. Adequate article stabilization has been achieved only by the use of slow moving conveying and feed mechanisms.

U.S. Pat. No. 3,761,134 to Hurd discloses a decelerator mechanism for slowing the progress of articles on an air cushion conveyor. The apparatus includes three cushioned rollers mounted at radially oriented positions in relation to a central rotating shaft. The cushioned rollers rotate above the conveyor surface. The forward edges of articles passing along the conveyor will impact the rollers. The slower moving rollers apply a decelerating force, slowing the progress of the article or a grouping of similar articles riding on the air cushion. While effective for its intended purposes, such apparatus has not been found satisfactory in an optical inspection system where the articles must be stabilized in laterally spaced orientations across a moving support surface.

Various hold down and cushioning mechanisms are also known. Such apparatus is shown by U.S. Pat. Nos. 1,749,156; 4,279,338; 1,514,281; and 2,154,844. Such apparatus are useful to hold bulk articles in position on conveyor systems. However, such apparatus is not suited to the particular purpose of stabilizing individual articles in spaced relation on a surface in an article inspection system. The various hold down and cushioning apparatus will temporarily halt or adjust the velocity of articles but typically do not assure a maintained stationary relationship between the article and moving support surface once the articles leave engagement with the hold down mechanism.

Stabilization of articles in discrete, laterally spaced orientation for high speed inspection, has therefore remained a problem. So, where quality inspection is desired, conveying systems have been run at speeds below the capacity of the inspection apparatus in order to achieve the product stability required by the inspection apparatus.

BRIEF DESCRIPTION OF THE DRAWINGS

A preferred form of the present invention is illustrated in the accompanying drawings, in which:

FIG. 4 is an enlarged sectional view taken substantially along line 4—4 in FIG. 3;

FIG. 5 is a perspective view of an alternate form of stabilizing means;

FIG. 6 is an enlarged sectional view taken substantially along line 6—6 in FIG. 5; and FIG. 7 is an enlarged fragmentary view of an open mesh material used for the present stabilizing means.

DETAILED DESCRIPTION OF THE PREFERRED EMBODIMENT

The following disclosure of the invention is submitted in compliance with the constitutional purpose of the Patent Laws "to promote the progress of science and useful arts" (Article 1, Section 8).

Figure 1:
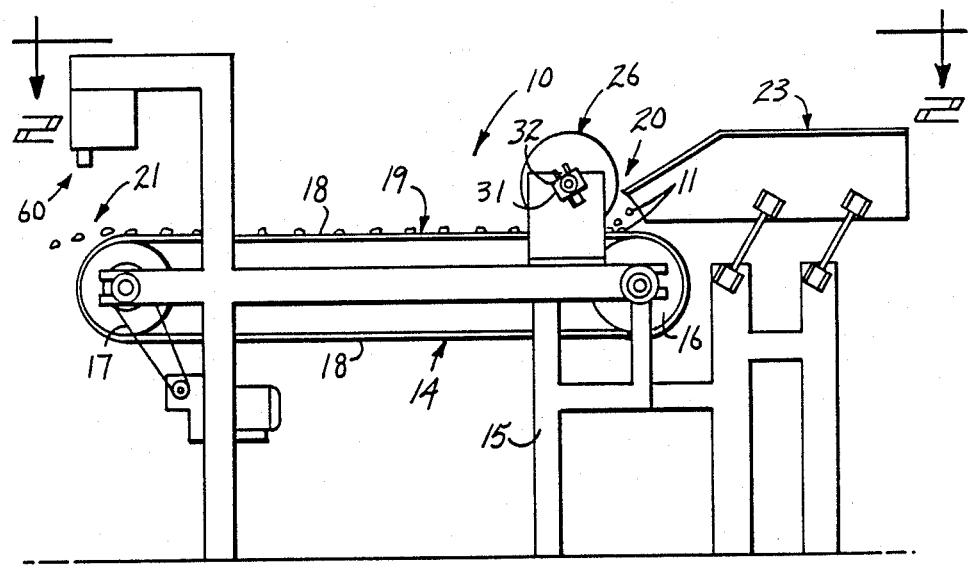
FIG. 1 is a side elevation view of an article inspection system exemplifying the present invention.
Figure 2:
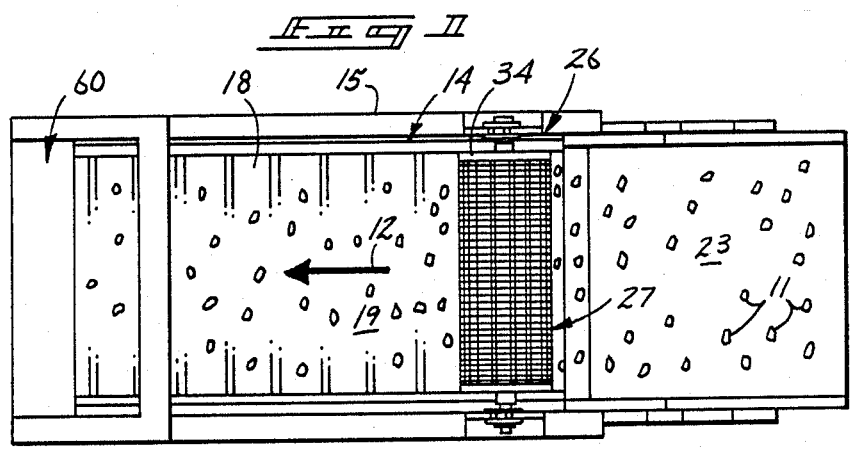
FIG. 2 is a top plan view of the system shown in FIG. 1.

The present article inspection system is designated in the drawings by the reference numeral 10. The present article inspection system 10 is utilized for inspecting individual articles 11 moved along a longitudinal path as shown in FIG. 2 by the directional arrow 12.

The present system preferably includes a conveyor 14 for moving the articles 11 along for inspection. Conveyor 14 is supported by a frame 15 and includes an infeed roll 16 at one end and a discharge roll 17 at an opposite end of the framework. An article feed station 20 is located upwardly adjacent the infeed roll 16, and a discharge station 21 is adjacent the discharge roll 17.

A conveyor belt 18 is trained about the rolls 16 and 17. The upper course of the conveyor belt 18 defines a working flight 19 that may be moved continuously at a prescribed high velocity. The velocity of the working flight may be substantially higher than belt velocities of related inspection systems due to the features to be described below.

A feed means 23 is utilized at infeed station 20 to deposit articles 11 in laterally spaced relation (FIG. 2) onto the working flight 19. The feed means may be in the form of a shaker table as shown. Alternatively, feed means 23 may be another form of conveying apparatus for supplying individual articles to the working flight 19 in laterally spaced relation.

The feed means 23 will typically deposit the articles with a directional velocity in the plane of the working flight 19 that is different (faster or slower) than the prescribed velocity of the working flight. The articles moving at different velocities will move relative to the working flight 19 when received on the belt at the feed station. That is, they will typically slide, roll or bounce along the working flight 19 in an unstable manner. The motion component of the deposited articles at the feed station 20 is, within reason, immaterial in the present system, due to provision of the stabilizing means 26 described in greater detail below.

The stabilizing means 26 is provided in the present system 10 with a surface 27 to engage and maintain lateral spacing of the articles, and to stabilize the articles in the direction and velocity of the working flight 19. The articles thus stabilized and laterally spaced will move in unison toward the inspection station 21 at the same high velocity as the working flight 19.

Two basic forms of the present stabilizing means 26 are exemplified in the drawings.

Figure 3:
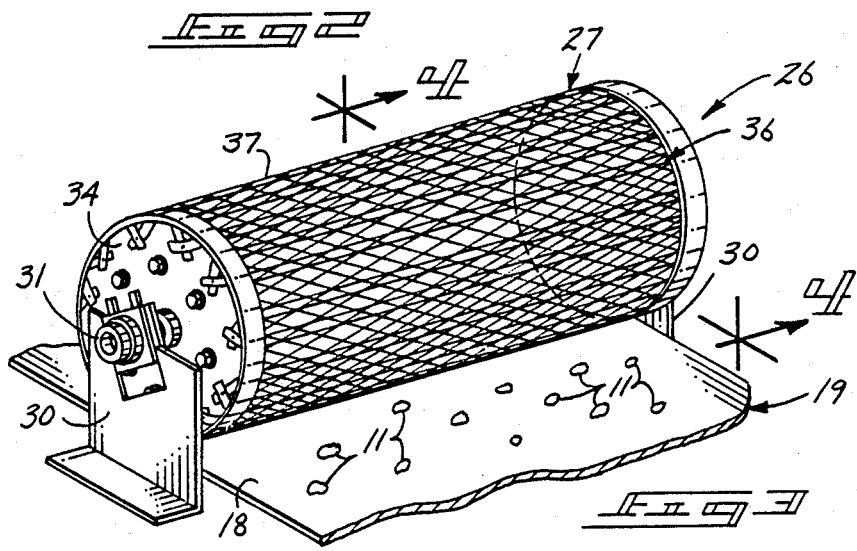
FIG. 3 is a perspective fragmented view showing a first form of stabilizing means of the present system.

FIGS. 3 and 4 illustrate a first form of the stabilizing means, while FIGS. 5 and 6 illustrate a second form. Both forms generally include a resilient core means 36. The surface 27 in both forms is advantageously a flexible open mesh sleeve 37 received over the core 36 and forming a substantially cylindrical periphery for engaging the articles 11.

Both forms of the stabilizing means 26 are mounted to the conveyor 14 by upstanding brackets 30. The brackets 30 extend upwardly on opposite sides of the belt 18 to adjustably mount bearings 31. Bearings 31, in turn, rotatably mount a shaft 32 that extends transversely across the width of belt 18.

In both stabilizer configurations, a pair of wheel hubs 34 are mounted to the shaft 32. The hubs 34 include friction rim members 40 for rolling contact with the working flight 19. The friction members 40 and hubs 34 act as drive means for rotating the stabilizing means 26 at a velocity equal to the prescribed high velocity of the working flight. The friction members 40, wheel hubs 34 and shaft 32 rotate responsive to movement of the working flight. Drive for the stabilizing means is therefore provided in direct response to the motion of the engaged working flight 19.

In the stabilizing means 26 shown in FIGS. 3 and 4 the resilient core 36 is formed by a number of resilient strands 41. The strands 41 extend along the axis of shaft 32 between wheel hubs 34. The strands 41 may be individual resilient segments, each extending between ends secured to the hubs 34. Alternatively, they may be one or more individual lengths of resilient material "threaded" through openings in the hubs to form the various strands. It is preferred that the strands be formed of surgical rubber, stretched between the hubs 34 at a tension sufficient to support the sleeve 37.

The individual strands 41 are spaced radially from the axis of the shaft 32 to define a substantially cylindrical outer periphery that receives the open mesh sleeve 37. The radius of the sleeve 37 (from the shaft axis) is slightly less than the radius from the shaft axis to driving surfaces or friction members 40 of the hubs 34. A space or gap (FIG. 4) is therefore created between the working flight 19 and the surface 27. The gap is preferably slightly less than the minimum height dimension for individual articles 11 on the working flight 19. With this arrangement, the surface 27 will not touch the working flight but will engage and deflect against all articles moving on the working flight 19 and will urge the articles into stationary laterally spaced position on the working flight.

The downward force urging the articles against the working flight is supplied through the resilient strands 41. It is important that the strands 41 have sufficient resiliency to deflect responsive to reception of an article between the surface 27 and working flight 19. To this end, it has been found that strands formed of the surgical rubber tubing function well when mounted between the hubs 34 and placed under sufficient tension to prevent sagging. The flexible open mesh sleeve can then be slidably received over the stretched tubes to form the surface 27.

Another form of the stabilizing means 26 is shown in FIGS. 5 and 6 wherein an alternate form of the resilient core 36 is shown. Here, flexible axial ribs 50 are provided. The ribs are secured to the shaft 32 and extend radially outward to the open flexible mesh 37. The ribs 50 preferably extend axially along the shaft to transversely span the working flight 11. Each rib 50 extends to an outward end 51 that is radially spaced from the central axis. The undeflected radial distance from the shaft axis to the ends 51 is preferably greater than the diameter of the open flexible mesh sleeve 37. The flexible ribs will therefore bend substantially as shown in FIG. 6 to slidably receive and hold the sleeve in the substantially cylindrical configuration.

It is preferred that the ribs 50 be constructed of a flexible material such as neoprene rubber. It has been found that neoprene rubber ribs having a thickness dimension of approximately 1/16th of an inch and a Durometer of approximately 60 to add sufficient resiliency and support to the flexible mesh 37.

It is noted that the friction members 40 in the configuration shown in FIGS. 5 and 6, may be separate from the mesh 37 and the resilient core 36. The drive members 40 in this example may simply be one or more wheels 34 mounted to the shaft with surfaces 40 in rolling engagement with the working flight 19. The radius from the shaft axis to the surface 27 is, as described above, slightly less than the radius to the friction members 40 in order to space the surface 27 above working flight 19. This provides slight clearance between the surface 27 and working flight 19 to avoid wear and to facilitate the stabilizing function.

The flexible ribs 50 are secured to the shaft by a number of axial mounting rods 52, 53. Several of the rods 52 are welded or otherwise secured to the shaft 32. The remaining rods 53 are releasably received between the fixed rods 52. The ribs 50 are received and clamped between the fixed rods 52 and removable rods 53. Clamp sleeves 54 may be provided to secure the removable rods 52 in position on the shaft.

The open flexible mesh 37, common to both forms of the stabilizing means described above, is a very important aspect of the present invention. The material selected for the mesh 37 should be a flexible, open lattice or net configuration as shown by FIG. 7 with large openings 56 in comparison with the size of the surrounding webbing or mesh material 57.

It is preferred that the mesh also be selected with openings 56 slightly smaller than the smallest cross-sectional dimension of the smallest article being handled. It is therefore unlikely that any articles 11 will become bound within the openings 56. The opening size may be selected according to the size of articles being handled. The shape of the openings 56 may also vary.

The open mesh avoids surface tension adhesion between the surface 27 and the articles 11. The narrow strips of webbing 57 defining the openings 56 minimize surface-to-surface contact between the mesh and the articles 11 while providing sufficient contact to stabilize the articles at the high velocity of the working flight 19.

It is preferred that the open flexible mesh 37 be formed of a smooth, flexible, water impervious plastic material such as polypropylene or polyethylene. Such material is sufficiently flexible in mesh configurations and may be made chemically acceptable for the food processing industry.

Both forms of the stabilizer means are very easy to clean and maintain. This is a very important feature especially in the food industry. Cleaning may be accomplished simply using a strong spray of water or, if necessary, a cleaning solution. The open construction of both forms allows free access for cleaning purposes.

An inspection means 60 is provided at the station 21 downstream of the stabilizer means 27 for inspecting the plurality of laterally spaced stabilized articles 11. It is preferable that the inspection means 60 be an optical inspection system similar to the system described in U.S. Pat. No. 4,581,632. Portions of that patent relating to the optical inspection apparatus are hereby incorporated by reference in the present application.

Operation of the present inspection system may commence with loading of articles within the feed means 23. The articles will be delivered by the feed means 23 in laterally spaced relation at feed station 20 onto the working flight 19 moving at high velocity below.

The feed means is provided to deposit the articles in a laterally spaced relationship so that a large number of articles may be inspected at a time at randomly spaced longitudinal and laterally intervals. With the present invention, the feed may be arranged so that more than 33% of the working flight is covered with product at any given time.

Most articles 11 leaving the feed means 23 will have a velocity and direction in the plane of the working flight 19 that is different than the high velocity of the working flight. The articles will therefore move with respect to the working flight 19 as they make contact at the feed station 20.

In order to maintain a high volume of articles being inspected, it becomes desirable to use a working flight velocity that is relatively high. With the present feed arrangement, coupled with a preselected high velocity of the working flight of approximately 517 feet per minute, inspection volume become considerably higher than previously available.

The inspection system is fully capable of inspecting individual articles at the above rate due to operation of the feed means and article stabilizing means 26. It is important that the articles be stabilized in the desired laterally spaced relation on the working flight. This is done by adjusting the velocity of the individual article to match that of the working flight and by maintaining the articles in their relative laterally spaced orientations on the working flight.

Stabilization of individual articles 11 is accomplished effectively by the stabilizing means 26 which is advantageously positioned closely adjacent to the feed station 20. Articles 11 received at the feed station 20 may slide, tumble or bound on the working flight 29 until engagement occurs between the rotating surface 27 of the stabilizing means and the upper surface of the working flight 19. The articles are engaged by the webbing 56 of the flexible mesh sleeve 37 which is moving at a direction and velocity equal to that of the working flight 19. Minimal surface contact is made between the mesh 37 and the articles 11 due to the open configuration of the mesh. This eliminates the possibility of surface tension adhesion between the articles and the rotating mesh webbing 57. The rotating mesh will therefore temporarily tangentially engage and stabilize the articles against the working flight and will subsequently rotate to disengage the articles, leaving them stationary on the working flight.

The rotating open mesh sleeve and resilient core will resiliently deflect (FIG. 4) responsive to contact with articles 11 on the working flight 19, gently pressing the engaged articles 11 against the working flight 19 and bringing them to precisely the same velocity as the working flight. The articles 11 will thereafter rest in stationary positions on the working flight and will maintain their desired spaced relationship across and along the working flight surface. Articles thus moving along the working flight may be accurately and effectively inspected by the downstream inspection means 22.

It is noted that the present system may be utilized for articles of different size and shape. Also, while intended to be used primarily with food products, it is entirely feasible that non-food items may also be individually inspected using the present system. Simple adjustments may be made in order to accommodate articles having different size. For example, care is taken to select a mesh size for the surface 27 that is slightly smaller than the smallest cross-sectional dimension of the articles to be engaged. Similar considerations may be made for the feed and conveyor mechanisms.

In compliance with the statute, the invention has been described in language more or less specific as to structural features. It is to be understood, however, that the invention is not limited to the specific features shown, since the means and construction herein disclosed comprise a preferred form of putting the invention into effect. The invention is, therefore, claimed in any of its forms or modifications within the proper scope of the appended claims, appropriately interpreted in accordance with the doctrine of equivalents.

We claim:

1. An article inspection system for inspecting a plurality of laterally spaced articles while moving along a longitudinal path, comprising:

a conveying means having a working flight for movement at a prescribed high velocity along the longitudinal path from an infeed station toward an article inspection station;

feed means for depositing the articles in laterally spaced relation onto the working flight at the infeed station at a different velocity than the prescribed high velocity of the working flight thereby causing relative movement between one or more of the laterally spaced articles and the working flight;

article stabilizing means having a surface moving at the prescribed high velocity of the working flight for engaging and bringing the moving articles to rest against the working flight in the laterally spaced relation and stationary on the working flight such that the articles and working flight move in unison toward the inspection station at the prescribed high velocity of the working flight;

wherein the article stabilizing means is comprised of:

a shaft rotatably mounted to the conveyor means and extending laterally over the working flight;

an open flexible mesh sleeve defining the surface of the article stabilizing means;

resilient core means supporting the open flexible mesh and rotating therewith in a circular path adjacent the working flight and for resilient deflection responsive to engagement of the open flexible means and resilient core means with an article on the working flight; and drive means for rotating the open flexible mesh about the axis of the shaft responsive to movement of the working flight at a velocity equal to that of the working flight; and inspection means at the inspection station for inspecting the plurality of laterally spaced articles at the inspection station.

2. The article inspection system as claimed by claim 1 wherein the resilient core means is comprised of a plurality of elongated resilient core members operatively mounted to the drive means and mounting the surface for resilient engagement with articles on the working flight.

3. The article inspection system as claimed by claim 1 wherein the resilient core is comprised of:

a plurality of flexible resilient ribs having inward ends operatively mounted to the drive means and extending transversely across the working flight; and wherein the resilient ribs having outward projecting ends supporting the flexible open mesh sleeve.

4. The article inspection system as claimed by claim 1 wherein the drive means is comprised of a friction member mounted on the shaft in rolling contact with the working flight for rotating the shaft responsive to movement of the working flight.

5. The article inspection system as claimed by claim 1 wherein the resilient core means supports the surface of the stabilizer means in a substantially cylindrical peripheral configuration adjacent to and extending transversely across the working flight.

6. The article inspection system as claimed by claim 1 wherein the open mesh sleeve is formed of a plastic material such as polypropylene.

7. The article inspection system as claimed by claim 3 wherein the resilient ribs are formed of neoprene.

* * * * *